(12) United States Patent
Kocic et al.

(10) Patent No.: US 7,266,160 B2
(45) Date of Patent: Sep. 4, 2007

(54) METHOD FOR JOINT DC OFFSET CORRECTION AND CHANNEL COEFFICIENT ESTIMATION IN A RECEIVER

(75) Inventors: Marko Kocic, Somerville, MA (US); Lidwine Martinot, Belmont, MA (US); Zoran Zvonar, Boston, MA (US)

(73) Assignee: Analog Devices, Inc., Norwood, MA (US)

( * ) Notice: Subject to any disclaimer, the term of this patent is extended or adjusted under 35 U.S.C. 154(b) by 645 days.

(21) Appl. No.: 10/689,330

(22) Filed: Oct. 20, 2003

(65) Prior Publication Data

US 2005/0084039 A1  Apr. 21, 2005

(51) Int. Cl.
H04L 25/06 (2006.01)

(52) U.S. Cl. ............... 375/319; 375/285; 375/346; 327/307

(58) Field of Classification Search ............... 375/319, 375/285, 346; 327/306, 307; 702/327; 708/307
See application file for complete search history.

(56) References Cited

U.S. PATENT DOCUMENTS

| | | | |
|---|---|---|---|
| 5,990,218 A | 11/1999 | Hill et al. | |
| 6,228,933 B1 | 5/2001 | Hiles | |
| 6,269,131 B1 * | 7/2001 | Gothe et al. | 375/346 |
| 6,370,205 B1 | 4/2002 | Lindoff et al. | |
| 6,542,560 B1 * | 4/2003 | Buehrer et al. | 375/346 |
| 7,133,442 B2 * | 11/2006 | Hamdi | 375/222 |

FOREIGN PATENT DOCUMENTS

| | | |
|---|---|---|
| WO | WO 01/06683 | 1/2001 |
| WO | WO 01/31867 | 5/2001 |

OTHER PUBLICATIONS

"Joint Channel and DC Offset Estimation and Synchronization with Reduced Computational Complexity for an EDGE Receiver," Krakovszky et al. *IEEE*. 2001. Siemens AG-Mobile Phones.
"Using a Direct Conversion Receiver in Edge Terminals, -A New DC Offset Compensation Algorithm," Bengt Lindoff. *IEEE*. 2000. Erisson Mobile Communications AB.
"Enhanced DC Estimation via Sequence-Specific Frequency Offset," Hui et al. *IEEE* 2002. Ericsson Mobile Platforms, AB.

\* cited by examiner

*Primary Examiner*—Chieh M. Fan
*Assistant Examiner*—Julia P Tu
(74) *Attorney, Agent, or Firm*—Gauthier & Connors LLP

(57) ABSTRACT

Although DC offset reduction schemes can be applied in the analog domain, the residual static DCO in baseband is still present, significantly influencing the performance of high-level modulation schemes employed by recent high-data-rate wireless communications standards. In order to achieve satisfactory performance, DCO compensation algorithms are required in the digital domain. One such algorithm was developed which is based on joint estimation of the Channel Impulse Response (CIR) and the static DCO and ensures satisfactory performance of EDGE modem with direct conversion radio architectures. A further modification of the joint estimation algorithm, the so-called "perturbed joint L", results in further improvement in the performance of the EDGE equalizer in critical fading channels.

20 Claims, 4 Drawing Sheets

METHOD FOR JOINT DC OFFSET CORRECTION AND CHANNEL COEFFICIENT ESTIMATION IN A RECEIVER

BACKGROUND OF THE INVENTION

The invention relates to the field of data receivers, and, in particular, to systems and methods for reducing DC offsets in wireless receivers.

The basic challenge in detection of transmitted data comes from distortion caused by the channel. Typically, channel refers to a combination of all non-ideal effects that adversely affect the ability to correctly detect the transmitted data sequence at the receiver. Such effects include, but are not limited to, effects of propagation (e.g. cable, radio channel etc.), non-linearities, or effects of transmit (TX) and receive (RX) filters. Current state-of-the-art detection techniques rely on the knowledge of the channel, which, therefore, must be estimated.

The background of the invention will be described in the wireless communication scenario, although invention can be used in any communication system. As is known in the art, in wireless communications received radio frequency signals are converted to baseband using various receivers. With a homodyne receiver, the received radio frequency signal is mixed with the local oscillator whose frequency is equal to carrier frequency of the received radio frequency signal to translate the carrier frequency to DC and thereby provide "direct conversion" of the modulation on the received radio frequency signal to a modulation at DC. Hence, a homodyne receiver is sometimes referred to as a direct conversion receiver.

While such direct conversion receivers offer the advantage of flexible architecture and educed cost, DC offset associated with such receivers is affecting the receiver performance. The level of the DC offset in direct conversion receiver may range from being significantly larger than the desired signal, i.e., modulation, to be demodulated to being comparable in level with desired signal. Thus, DC offset compensation techniques are typically required. To insure flexibility for different operating conditions, DC offset compensation can be part of the digital baseband portion of the receiver, preferably a part of the digital signal processing (DSP) firmware. One application of direct conversion receivers is in mobile or cellular communication systems. In such systems, the radio channels received signals also suffer from intersymbol interference (ISI) caused by multipath radio propagation and transmitter and/or receiver filtering. We further explain the underlying principle using the specific format of Time Division Multiple Access (TDMA) system as represented by GSM/GPRS/EDGE cellular standard.

The original GSM system, of which GPRS and EDGE are extensions, is a TDMA system, which means that a particular channel is active only during specified time periods. In this case, each channel is divided into eight time slots, with user being active at only every eight slots for voice transmission, or utilizing multiple slots for data transmission per standard specification.

GSM (including GPRS and EDGE) uses the midamble training sequence (a training sequence placed in the middle of the burst of data that occurs in a given slot) in every burst. The system parameters are chosen so that the change in Channel Impulse Response (CIR) is fairly small during one burst so that adaptive CIR estimation is not needed. The midamble training sequence minimizes the distance (in time) between the known portion of the burst (the training sequence) and the ends of the burst, thereby also minimizing CIR change with respect to the CIR estimate obtained from the training sequence.

In EDGE system, the combined channel response usually consists of the linear TX Gaussian shaping filter (CO), actual physical channel, and TX/RX filters (analog and/or digital filters). A set of channel models is used for performance evaluation and covers a wide range of typical physical propagation channels that are likely to be encountered in practice as specified by the standardization bodies (ETSI, 3GPP). These channels are denoted by:

static (no ISI or fading)
  TU3 (typical urban, velocity of the mobile station (MS) 3 km/h, moderate multipath, low fading)
  TU50 (typical urban, velocity of the MS 50 km/h, moderate multipath and fading)
  RA250 (rural area, MS velocity 250 km/h, no multipath, severe fading) HT100 (hilly terrain, MS velocity 100 km/h, severe multipath, significant fading).

GSM training sequences (shared by GPRS and EDGE) have good autocorrelation properties. GSM/GPRS systems use GMSK modulation format, while EDGE introduces the new 8-PSK modulation format. In EDGE, training sequences for GMSK and 8-PSK modulation are identical, binary, and differ only due to different additional rotation applied to the signal in two modulation schemes. GMSK effectively rotates a signal 90 degrees every symbol, while EDGE 8-PSK uses the rotation of $3\pi/8$ for every symbol. Properties of the training sequences are used to simplify CIR estimation. For example, due to good autocorrelation properties of training sequences, simple cross-correlation can be used for CIR estimation.

In a typical data receiver realization in GSM/GPRS/EDGE system, the whole received burst is stored and the all-digital techniques may be applied to signal processing, including DC offset compensation. Thus, referring to FIG. 1, the data receiver stores the burst of data, r(k), where k=1 . . . N and N is the number of samples in the burst. Each burst includes a mid-amble having a known sequence of bits disposed between data, (i.e., information bits) as shown. Such known sequence of bits is used to aid in equalization and more particularly for enabling channel estimation, which includes timing information, length of the CIR, calculation of CIR taps as well as the alignment of the CIR estimate with respect to the largest magnitude CIR tap, and DC offset estimation. As shown in FIG. 1, an estimate of the DC offset, Â, is calculated. The estimated DC offset, Â, is subtracted from the received burst. The result, r(k)−Â, where k=1 . . . N, is processed to find an estimate of the h. The CIR estimate, ĥ, can be obtained by a variety of methods including cross-correlating [r(k)−Â] with the known mid-amble bit sequence, using Least Square (LS) estimation as well as other advanced techniques.

The simplest method for channel estimation in GSM is cross-correlation. In cross-correlation CIR estimation, the inner 16 symbols of the training sequence are correlated with the received symbol. The received symbol at time k is given by:

$$y_n = \sum_{i=0}^{L-1} h_i t_{n-i} + z_n$$

where $y_k$ is the received signal, $h_k$ are CIR taps, $t_k$ is the known training sequence (or data), while $z_k$ is AWGN with variance $\sigma^2$. The following notation is used to differentiate between the (known) training sequence and (generally unknown) data. Training sequence symbols are denoted by $t_0$ to $t_{25}$. Data for the left data burst are denoted $d_0$ to $d_{57}$, while those for the right data burst are denoted $d_{58}$ to $d_{115}$. By cross-correlation with the inner 16 training sequence symbols:

$$\hat{h}_k = \frac{1}{16}\sum_{j=5}^{20} y_{k+j} t_j$$

$$= \frac{1}{16}\sum_{j=5}^{20} t_j \left(\sum_{i=0}^{L-1} h_i t_{j-i+k} + z_{j+k}\right)$$

$$= \frac{1}{16}\sum_{i=0}^{L-1} h_i \sum_{j=5}^{20} t_j t_{j-i+k} + \frac{1}{16}\sum_{j=5}^{20} t_j z_{j+k}.$$

Due to autocorrelation properties of the training sequences, $$\sum_{j=5}^{20} t_j t_{j-i+k} = 0,$$

unless $i=k$ (provided $|k-i|<5$), $$\hat{h}_k = \frac{1}{16}\sum_{j=5}^{20} y_{k+j} t_j$$

$$= h_k + \frac{1}{16}\sum_{j=5}^{20} t_j z_{j+k}$$

$$= h_k + \Delta h_k.$$

$\Delta h_k$ denotes CIR tap estimation error due to noise. The main limitation of cross-correlation CIR estimation is that it can only provide accurate estimates of up to 6 CIR taps. If CIR is longer than 6, and HT100 channel profiles span seven symbols when convolved with Gaussian pulse CO (3 symbols span), cross-correlation CIR estimation produces inaccurate estimates for all but six initial taps.

For example, for CIR length of 6, in matrix notation, $\hat{h}$ is given by:

$$\hat{h} = C(Th + z) \text{ where}$$

$$C = \begin{bmatrix} t_5 & t_6 & \cdots & t_{20} & 0 & \cdots & \cdots & 0 \\ 0 & t_5 & \cdots & \cdots & t_{20} & 0 & \cdots & 0 \\ \vdots & \ddots & \ddots & & & \ddots & \ddots & \vdots \\ \vdots & & \ddots & \ddots & & & \ddots & 0 \\ 0 & \cdots & \cdots & 0 & t_5 & \cdots & \cdots & t_{20} \end{bmatrix}$$

-continued $$T = \begin{bmatrix} t_5 & t_4 & \cdots & t_0 \\ t_6 & t_5 & \cdots & t_1 \\ \vdots & & & \vdots \\ t_{25} & \cdots & \cdots & t_{20} \end{bmatrix}$$

In general, matrix T is equal to $$T = \begin{bmatrix} t_{L-1} & t_{L-2} & \cdots & t_0 \\ t_L & t_{L-1} & \cdots & t_1 \\ \vdots & & & \vdots \\ t_{25} & \cdots & \cdots & t_{25-L+1} \end{bmatrix}$$

and matrices C and T are of dimensions $(16+L-1 \times L)$ and $(26-L+1 \times L)$, respectively. This form of matrix T assumes perfect synchronization (i.e., exact knowledge of the length of the channel and position of the training sequence). It should be noted that matrix T will consist only of training sequence symbols as long as $26-L+1 \geq 16+L-1$, which implies that $L \leq 6$. In the case $L>6$, matrix T must include some data samples in addition to training sequence symbols. For example, $$T = \begin{bmatrix} t_5 & t_4 & \cdots & t_0 & d_{57} \\ t_6 & t_5 & \cdots & t_1 & t_0 \\ \vdots & \vdots & & \vdots & \vdots \\ t_{25} & t_{24} & \cdots & t_{20} & t_{19} \\ d_{58} & t_{25} & \cdots & t_{21} & t_{20} \end{bmatrix}$$

Thus, estimates for CIR taps 0 and 6, in this case, become:

$$\hat{h}_0 = h_0 + \frac{1}{16}\left(t_5 d_{57} + \sum_{j=6}^{20} t_j t_{j-6}\right) h_6 + f(z)$$

$$\hat{h}_6 = h_6 + \frac{1}{16}\left(t_{20} d_{58} + \sum_{j=6}^{19} t_j t_{j+6}\right) h_0 + f(z).$$

It can be seen that both the first and last CIR tap estimates will be distorted. This is much more significant in the case of the last tap, $h_6$, as the first tap can, in some cases, be very large.

In matrix notation, cross-correlation CIR estimates are given by $$\hat{h} = \frac{1}{16} Cr = \frac{1}{16} C(Th + z) = h + \frac{1}{16} Cz = h + \Delta h$$

A CIR error covariance matrix is given by $$E[\Delta h \Delta h^H] = \frac{1}{16^2} E[Czz^H C^H] = \frac{\sigma^2}{16^2} CC^H$$

where (for $L \leq 5$, and perfect synchronization) $CC^H$ is approximately equal to $16 I$ (I is identity matrix). If $L \geq 7$, or in case of imperfect synchronization, the estimation error covariance matrix becomes a function of CIR and data in addition to the error caused by AWGN. In general, CIR estimation error covariance is roughly equal to a $\sigma^2/16$ for all taps with cross-correlation CIR estimation.

In order to start CIR estimation, the position of the training sequence needs to be identified. The first synchronization step takes place on a once-per-symbol sampled received signal. Synchronization is performed by correlating the entire training sequence with the received signal. The result is given by $$a_k = \sum_{j=0}^{25} y_{k+j} t_j$$

$$= \sum_{j=0}^{25} t_j \left( \sum_{i=0}^{L-1} h_i t_{j-i+k} + z_{j+k} \right)$$

$$= \sum_{i=0}^{L-1} h_i \sum_{j=0}^{25} t_j t_{j-i+k} + \sum_{j=0}^{25} t_j z_{j+k}$$

$$a_k = \sum_{i=0}^{L-1} h_i \sum_{j=0}^{25} t_j t_{j-i+k} + \sum_{j=0}^{25} t_j z_{j+k}$$

$$= h_k T(0) + \sum_{\substack{i=0 \\ i \neq k}}^{L-1} h_i T(k-i) + f(t,z)$$

where T(0) is the auto-correlation of the training sequence at delay of 0 (equal to 26) while T(k−i) are auto-correlations of the training sequence at different delays combined with cross-correlation with data symbols. In this case, T(k−i) are typically significantly smaller than T(0) so that $a_k$ is roughly equal to $h_k T(0)$. Consequently, the index of the largest magnitude $a_k$ corresponds to the position of the training sequence start, shifted by the position of the largest magnitude CIR tap with respect to the first CIR tap (tap 0).

After finding the approximate position of the largest magnitude CIR tap, the CIR span and the actual start of the training sequence (and therefore the whole burst) need to be established. The received burst can be envisioned as a superimposition of several copies of the original data— echoes—due to different CIR taps. As the largest magnitude CIR tap is not necessarily the first tap in the CIR, the echo corresponding to this tap does not necessarily correspond to the real start of the training sequence. Thus, a solution is needed to identify how many taps are present in the CIR and where the CIR starts (i.e. how many taps exist in front of the largest magnitude tap).

Usually, the length of the CIR is determined in advance and is supposed to be sufficient to cover the span in the worst-case scenario. In EDGE that is the HT100 channel, with about 7 taps. The extent of the CIR is determined as follows: after finding the location of the largest magnitude taps, rough estimates are obtained of another ten taps on both sides of the largest magnitude tap using cross-correlation CIR estimation. These ten taps are selected based on the properties of the training sequence. Since the largest magnitude tap is a part of the CIR, the remaining taps that can be correctly estimated using cross-correlation must be on either side or both sides of the largest magnitude tap. Thus, these extra ten taps are estimated, with the knowledge that at least five of them are correct. These are usually the largest magnitude taps out of the estimated eleven. Thus, the next step is usually to apply the so-called maximum energy algorithm. The magnitudes of all tentatively estimated taps are computed. Then, the CIR energy is computed given that CIR should have L taps by adding the magnitudes of L taps for different valid delays. The maximum energy delay is taken as the correct CIR span. If the index of the largest magnitude tap is given by max_idx, and the shift of the maximum energy CIR span with respect to max_idx is tap_shift, then the start of the burst is given by max_idx-tap_shift-61.

In Least Squares CIR estimation, a matrix representation model for the channel is given by r=Th+z, where $$T = \begin{bmatrix} t_{L-1} & t_{L-2} & \cdots & t_0 \\ t_L & t_{L-1} & \cdots & t_1 \\ \vdots & & & \vdots \\ t_{25} & \cdots & \cdots & t_{25-L+1} \end{bmatrix}$$

$$h = [h_0 \ h_1 \ \ldots \ h_{L-1}]^T, r = [r_{L-1} \ r_L \ r_{L+1} \ \ldots \ r_{25}]^T,$$

and $z = [z_{L-1} \ z_L \ z_{L+1} \ \ldots \ z_{25}]^T$.

Then, the LS CIR estimate is given by $$\hat{h} = (T^H T)^{-1} T^H r = (T^H T)^{-1} T^H (Th+z) = h + (T^H T)^{-1} T^H z = h + \Delta h$$

Unlike the cross-correlation CIR estimation, the LS CIR estimation is a coupled problem. In a LS CIR estimate, every estimated CIR tap depends on other estimated CIR taps. Thus, the value of the estimated taps in the LS CIR estimate depends on the time alignment of the estimator with respect to the largest magnitude tap, inasmuch as the contribution of every omitted significant CIR tap is distributed between the remaining taps in the LS CIR estimation. Consequently, while the initial synchronization step remains unchanged with respect to cross-correlation CIR estimation, the optimal CIR alignment step is significantly different.

To find the optimal CIR span and alignment with respect to the largest magnitude CIR tap, all CIR estimates need to be identified with particular L that include the largest magnitude CIR tap and then pick the one that is the best fit in some sense (for example, model fitting error).

Unfortunately, this procedure is very complex—about three to six times more complex than cross-correlation CIR estimation. Furthermore, the simplest way to reduce the complexity of the CIR alignment step, by obtaining a rough LS CIR estimate consisting of 11 CIR taps, as with cross-correlation CIR estimation, results in a CIR estimation error that is far inferior to that achievable with cross-correlation CIR estimation.

Consequently, if the optimal CIR alignment procedure is too complex, the cross-correlation CIR estimate can be used as a rough CIR estimate and thus obtain the parameters required to find a better CIR estimate, CIR length L, and the alignment of the CIR estimate with respect to the largest magnitude CIR tap. The procedure for obtaining these parameters is the same as for cross-correlation CIR estimation (described above).

For LS CIR estimation, an estimation error is given by $\Delta h = (T^H T)^{-1} T^H z$, while estimation error covariance matrix is given by:

$$E[\Delta h \Delta h^H] = E[(T^H T)^{-1} T^H z z^H T (T^H T)^{-1}] = \sigma^2 (T^H T)^{-1}$$

Error covariance for individual taps is given by diagonal elements of the estimation error covariance matrix and is roughly equal to $\sigma^2/(26-L+1)$ for LS CIR estimation. As off-diagonal elements of $(T^H T)^{-1}$ are in general not equal to zero (although small), LS CIR estimation errors are correlated, but only slightly.

Parameters obtained by channel estimation, including DC offset and CIR estimates, are further sent to data receiver and are used to enable the demodulation process (e.g. prefilter calculation, equalization algorithm selection, calculation of the path metric of trellis based equalizers, etc.)

SUMMARY OF THE INVENTION

The present invention provides for a method for reducing DC offset associated with a receiver comprising the steps of: (a) receiving the received bust r(n); (b) storing the received burst samples, r(n), in a memory; (c) averaging said stored burst samples, r(n), and calculating an initial DC offset, $A_0$, from the stored burst samples; (d) removing DC offset value from stored burst as follows: $r(n)-A_0$; (e) identifying a rough timing estimate defining a position of largest channel impulse response (CIR) tap via cross-correlating stored burst data with a training sequence; (f) performing fine CIR synchronization to identify taps to be added to said identified largest CIR tap; (g) estimating an updated DC offset, $A_1$, and a CIR, ĥ, via a perturbed LS CIR estimation where the received burst r(n) is modeled as follows:

$$r_j = \sum_{i=0}^{L-1} h_i t_{j-i} + f_j m + z_j$$

where $h_i$ are CIR taps, $t_j$ are known training sequence symbols, $f_j$ is a generic function of j, m is static DC offset; and $z_j$ is additive white Gaussian noise, and removing updated DC offset from stored burst as follows: $r(n)-A_0-A_1$. Perturbed LS CIR estimation can be carried in one step using the model stated above, or in two steps where first step consists of joint DC offset and CIR estimation and the second step is based on the model stated above.

DETAILED DESCRIPTION OF THE INVENTION

Although the present invention has been shown and described with respect to several preferred embodiments thereof, various changes, omissions, and additions to the form and detail thereof may be made therein without departing from the spirit and scope of the invention.

In Direct Conversion receivers DC offset is created by the self-mixing of either the received signal or the Local Oscillator (LO) signal. In case of the received signal, signal leakage causes self-coupling via the LO path. In case of the LO signal, leakage and reflection from the antenna allow a portion of the LO signal to couple via the signal path, resulting in self-mixing. Both mechanisms produce two components: one at DC and the other one at 2 times the carrier frequency. While the second component is removed by LP filtering, the DC component introduces DC offset, which, in some cases, can be very large. In general, the signal to DC offset ratio (expressed in dB) can be negative. LO-produced DC offset is usually constant over the received burst, changing slowly depending on IC temperature, IC layout, and design and other environmental factors. DC offset in Direct Conversion receivers must be somehow corrected in the baseband to maintain reliable reception. While with GMSK modulation simple DC offset compensation schemes such as simple averaging or circle center estimation are sufficient, 8-PSK modulation that is used in some of EDGE modes requires a more sophisticated DC offset compensation scheme.

Figure 1:
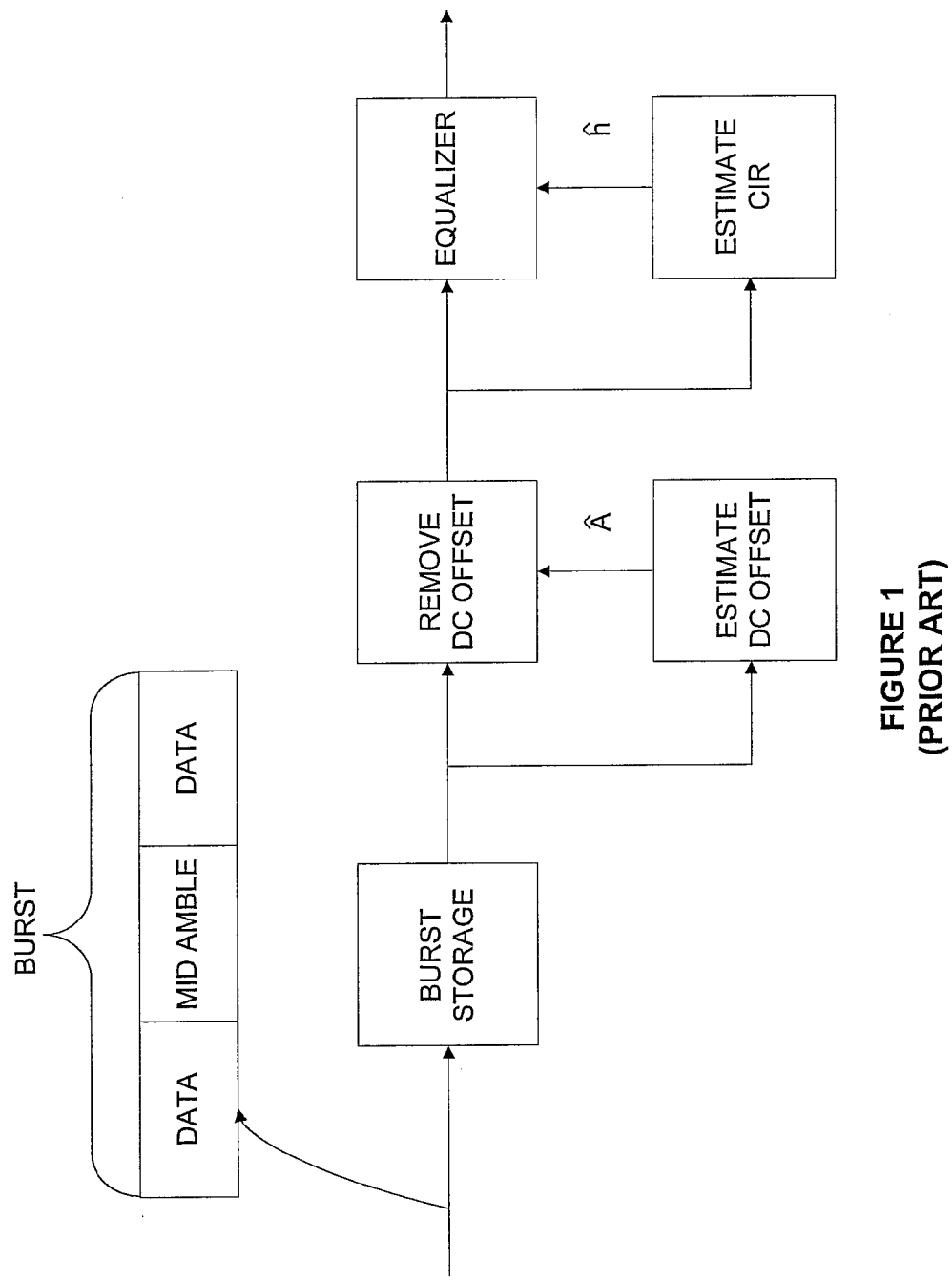
FIG. 1 illustrates a block diagram of a data receiver in accordance with the prior art.
Figure 2:
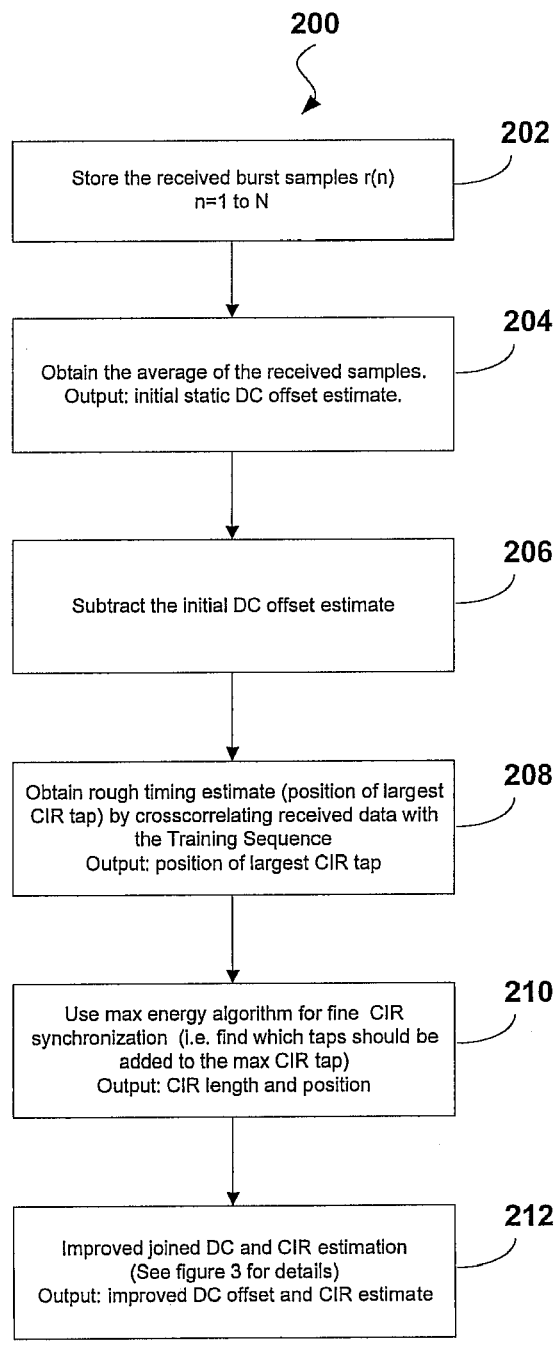
FIG. 2 illustrates an overview of the present invention's method for reducing DC offsets at the receiver.

FIG. 2 illustrates an overview of the present invention's method 200 for reducing DC offsets at the receiver. In step 202 burst samples, r(n), are received and stored locally at the receiver. Next, in step 204, the stored burst samples, r(n), are averaged and an initial DC offset, $A_0$, is identified. In step 206, the DC offset value is removed from the stored burst as follows: $r(n)-A_0$. In step 208, a rough timing estimate of the position of largest a channel impulse response (CIR) is obtained by cross-correlating received data with a training sequence. Next, in step 210, the maximum energy algorithm for fine CIR synchronization is used to find which taps should be added to the maximum CIR tap. Further, in step 212, an updated DC offset, $A_1$, and CIR, ĥ, are estimated via a perturbed LS CIR estimation representation modeling received burst r(n) as follows:

$$r_j = \sum_{i=0}^{L-1} h_i t_{j-i} + f_j m + z_j$$

where $h_i$ are CIR taps, $t_j$ are known training sequence symbols, $f_j$ is a generic function of j, m is static DC offset; and $z_j$ is additive white Gaussian noise. The updated DC offset is then removed from stored burst as follows: $r(n)-A_0-A_1$.

Figure 3:
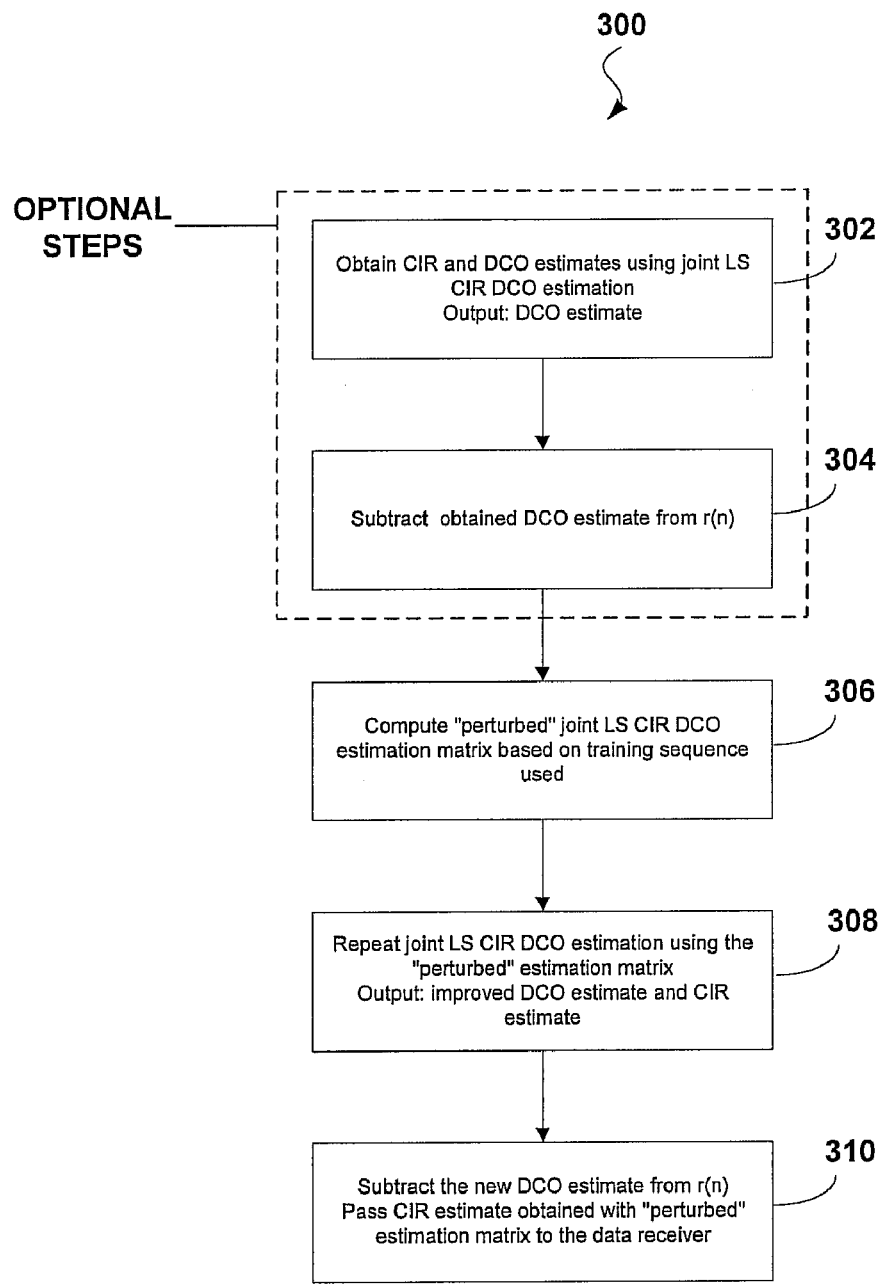
FIG. 3 illustrates an overview of the present invention's "perturbed" joint DC offset and CIR estimation algorithm.

FIG. 3 provides a general overview of the present invention's "perturbed" joint DC offset and CIR estimation algorithm 300. In step 302, a joint least squares (LS) CIR DC offset (DCO) algorithm is used to obtain initial CIR and DCO estimates. It is important to note that LS is one of the possible approaches in joint CIR DC offset estimation as outlined in Zvonar's U.S. Pat. No. 6,504,884. It is used in the description as specific computational method, though it can be replaced by other methods such as iterative computation, MMSE, etc.

Next, in step 304, the calculated DCO estimate is subtracted from the received signal burst, r(n). It should be noted that steps 302 and 304 are optional, depending on the required quality of the estimate. Further, in step 306, a "perturbed" joint LS CIR DCO estimation matrix is computed based upon the training sequence used. In step 308, the LS CIR DCO estimation is repeated using the above-mentioned "perturbed" estimation matrix. Next, in step 310, the newly calculated DCO estimate is subtracted from the received signal burst, r(n).

Figure 4:
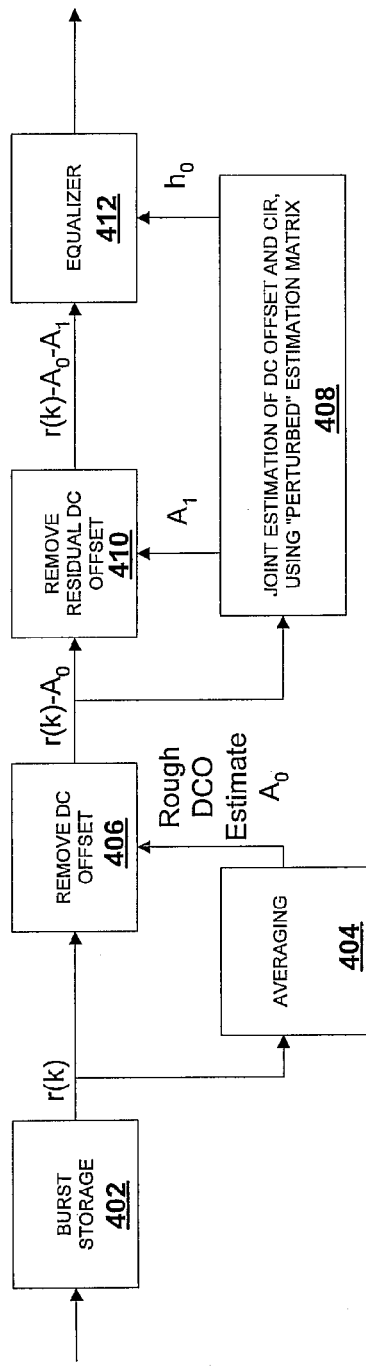
FIG. 4 illustrates an overview of a system implemented in the receiver incorporating the methods of FIGS. 2 and 3.

FIG. 4 illustrates an overview of a system 400 implemented in the receiver incorporating the methods of FIGS. 2 and 3. The received signal is stored in burst storage 402. Next, burst signal, r(k), stored in 402 is input into block 404, which performs a joint estimation of DC offset and CIR.

DCO $A_0$ estimated in block 404 is forwarded to block 406, which then removes the DC offset as follows: $r(k)-A_0$. Next, the residual DC offset is estimated, in block 408, via a joint estimation of DC offset and CIR using a "perturbed" estimation matrix, and block 410 removes the calculated residual DC offset as follows: $r(k)-A_0-A_1$. Further, the estimated channel impulse response, $h_0$, is forwarded to equalizer 412. A detailed description of the steps of FIGS. 2 and 3 are now presented.

Averaging

Averaging typically removes existing DC offset. Unfortunately, however, it also introduces a DC offset that is a function of the data and channel response. If the averaging is confined to the training sequence, then the data portion of this introduced DC offset is known. The drawback of limiting averaging to the training sequence only is that the DC noise term will be larger than if the averaging is conducted over the entire burst. Considering a received signal corresponding to the training sequence, $$r_n = m + \sum_{i=0}^{L-1} h_i t_{n-i} + z_n$$

where $r_n$ is the received signal, m is the fixed DC offset, $h_i$ is the channel taps, to is the training sequence, and $z_n$ is the AWG noise. By averaging the signal over the training sequence, $\hat{m}$ is given by:

$$\hat{m} = \frac{1}{M} \sum_{j=0}^{M-1} y_j = m + \frac{1}{M} \sum_{i=0}^{L-1} h_i \sum_{j=0}^{M-1} t_{j-1} + \frac{1}{M} \sum_{j=0}^{M-1} z_j$$

After subtracting the DC offset estimate from $r_n$, $$\hat{r}_n = r_n - \hat{m} = \sum_{i=0}^{L-1} h_i \left( t_{n-i} - \frac{1}{M} \sum_{j=0}^{M-1} t_{j-1} \right) + z_n - \frac{1}{M} \sum_{j=0}^{M-1} z_j$$

It should be noted that if channel estimation uses the received signal samples corrected by the average burst amplitude term, the DC offset estimation always works on the same type of problem (residual DCO which is a function of data and noise) and the algorithm can be fine-tuned.

Joint LS DC Offset and CIR Estimation

A simple modification of the CIR model allows the joint estimation of CIR and DC offset. The general framework of joint CIR and DC offset estimation has been presented in the Zvonar's U.S. Pat. No. 6,504,884. For the purposes of this discussion, specific focus is directed towards a specific case of joint estimation using LS estimation. The received signal is rewritten as $$r_j = \sum_{i=0}^{L-1} h_i t_{j-i} + m + z_j$$

where m is the DC offset. In matrix form, the above equation is rewritten as r=Th+z, where T becomes $$T = \begin{bmatrix} t_{L-1} & t_{L-2} & \cdots & t_0 & 1 \\ t_L & t_{L-1} & \cdots & t_1 & 1 \\ \vdots & & & \vdots & 1 \\ t_{25} & \cdots & \cdots & t_{25-L+1} & 1 \end{bmatrix}$$

$h=[h_0 \; h_1 \; \ldots \; h_{L-1} \; m]^T$, while r and z are unchanged. The LS CIR estimator remains unchanged, except that now a different matrix T is used to estimate L+1 taps. After estimation, the DC offset estimate is subtracted from the received signal.

Synchronization, CIR Alignment and CIR Length

In the presence of DC Offset, performance of all steps prior to actual CIR (plus DCO) estimation deteriorates. Some of the steps, such as initial synchronization, are robust and fairly immune to DCO, while others, such as rough cross-correlation CIR estimation, deteriorate more.

Initial synchronization is obtained by cross-correlating the whole training sequence with a received signal buffer. The delay that produces the largest magnitude cross-correlation is taken for the index of the largest CIR tap and the start of the training sequence realization corresponding to that tap.

The optimal fine CIR synchronization procedure with LS type estimates consists of repeating LS CIR DCO estimation for different CIR offsets, including the largest magnitude tap and picking the CIR+DCO realization with maximum energy. However, this procedure would require eleven repetitions of the LS CIR DCO estimation for different delays and is excessively complex. Instead, a suboptimal fine synchronization procedure can be used wherein the cross-correlation CIR estimate is used as a rough CIR estimate.

CIR Estimation Error

It is interesting to consider the relationship between the LS CIR estimation and the joint LS CIR DCO estimation. The LS problem to be solved is given by $T^H T h = T^H r$. In case of joint LS CIR DCO estimation, $T^H T$ is given by $$T^H T = \begin{bmatrix} \sum_{j=L-1}^{25} |t_j|^2 & \sum_{j=L-1}^{25} t_j^H t_{j-1} & \cdots & \sum_{j=L-1}^{25} t_j^H t_{j-L+1} & \sum_{j=L-1}^{25} t_j^H \\ \sum_{j=L-1}^{25} t_j t_{j-1}^H & \sum_{j=L-1}^{25} |t_{j-1}|^2 & \cdots & \sum_{j=L-1}^{25} t_{j-1}^H t_{j-L+1} & \sum_{j=L-1}^{25} t_{j-1}^H \\ \vdots & \vdots & & \vdots & \vdots \\ \sum_{j=L-1}^{25} t_j t_{j-L+1}^H & \sum_{j=L-1}^{25} t_{j-1} t_{j-L+1}^H & \cdots & \sum_{j=L-1}^{25} |t_{j-L+1}|^2 & \sum_{j=L-1}^{25} t_{j-L+1}^H \\ \sum_{j=L-1}^{25} t_j & \sum_{j=L-1}^{25} t_{j-1} & \cdots & \sum_{j=L-1}^{25} t_{j-L+1} & 26-L+1 \end{bmatrix}$$

while $T^H r$ is given by $$T^H r = \begin{bmatrix} \sum_{j=L-1}^{25} t_j^H r_j \\ \sum_{j=L-1}^{25} t_{j-1}^H r_j \\ \vdots \\ \sum_{j=L-1}^{25} t_{j-L+1}^H r_j \\ \sum_{j=L-1}^{25} r_j \end{bmatrix}$$

The last row of the equation gives an expression for DCO estimation:

$$\hat{m} = \frac{1}{26-L+1}\left(\sum_{j=L-1}^{25}\left(r_j - \sum_{i=0}^{L-1} \hat{h}_i t_{j-i}\right)\right)$$

Parameter m can be eliminated from the above equation, thus obtaining the expression for the estimation of CIR only:

$$\hat{h} = (T^H(T-\Delta T))^{-1} T^H(r-\bar{r})$$

where T is now of reduced dimension (L×26−L+1), $\Delta T$ is a (L×26−L+1) matrix given by $$\Delta T = \frac{1}{26-L+1} \begin{bmatrix} \sum_{j=L-1}^{25} t_j & \sum_{j=L-1}^{25} t_{j-1} & \cdots & \sum_{j=L-1}^{25} t_{j-L+1} \\ \vdots & \vdots & & \vdots \\ \vdots & \vdots & & \vdots \\ \sum_{j=L-1}^{25} t_j & \sum_{j=L-1}^{25} t_{j-1} & \cdots & \sum_{j=L-1}^{25} t_{j-L+1} \end{bmatrix}$$

while $$\bar{r} = \frac{1}{26-L+1}\begin{bmatrix}\sum_{j=L-1}^{25} r_j \\ \vdots \\ \vdots \\ \sum_{j=L-1}^{25} r_j\end{bmatrix}$$

is a (L×1) vector.

Note that it can be shown that the following relations are valid:

$$T^H \Delta T = \Delta T^H T = \Delta T^H \times T$$

$$\Delta T^H r = \Delta T^H \bar{r}$$

Consequently, $$\hat{h} = (T^H(T-\Delta T))^{-1} T^H(r-\bar{r}) = ((T-\Delta T)^H (T-\Delta T))^{-1}(T-\Delta T)^H(r-\bar{r})$$

and, since $$\bar{r} = mU + \Delta Th + \bar{z}U \text{ (where } \bar{z} = \frac{1}{26-L+1}\sum z_j\text{)}$$

and U is the column vector with elements equal to 1), the CIR estimate becomes $$\hat{h} = ((T-\Delta T)^H(T-\Delta T))^{-1}(T-\Delta T)^H(r-\bar{r}) = (\tilde{T}^H \tilde{T})^{-1}\tilde{T}^H(r-\bar{r})$$

while $$r-\bar{r} = mU+Th+z-mU-\Delta Th-\bar{z}U = (T-\Delta T)h+z-\bar{z}U = \tilde{T}h+z-\bar{z}U.$$

Hence, $$\hat{h} = (\tilde{T}^H \tilde{T})^{-1}\tilde{T}^H(r-\bar{r}) = (\tilde{T}^H \tilde{T})^{-1}\tilde{T}^H(\tilde{T}h+z-\bar{z}U) = h + (\tilde{T}^H \tilde{T})^{-1}\tilde{T}^H(z-\bar{z}U) = h+\Delta h$$

The joint LS CIR DCO estimation error covariance matrix for CIR taps therefore becomes $$E[\Delta h \Delta h^H] = (\tilde{T}^H \tilde{T})^{-1}\tilde{T}^H E[(z-\bar{z}U)(z-\bar{z}U)^H]\tilde{T}(\tilde{T}^H \tilde{T})^{-1} = \sigma^2(\tilde{T}^H \tilde{T})^{-1}$$

In other words, the effect of a joint LS CIR DCO estimation on CIR estimation error is that the CIR estimation error covariance matrix, $(T^H T)^{-1}$, is perturbed by the matrix $T^H \Delta T$. If the elements of matrix $T^H \Delta T$ were small, the CIR estimation error would not be strongly affected. Unfortunately, in most EDGE training sequences (sequences number 2 to 7) the elements of matrix $T^H \Delta T$ are quite large and contribute to the significant worsening of CIR estimation error. For example, for L=7 and training sequence TSC=5, the CIR estimation error is reduced from roughly $\sigma^2/20$ (20=26−7+1) to roughly $\sigma^2/13$, which is even worse than what is ideally expected from the cross-correlation CIR estimation error.

As shown earlier, the DCO estimate in the joint LS CIR DCO estimation is given by $$\hat{m} = \frac{1}{26-L+1}\left(\sum_{j=L-1}^{25}\left(r_j - \sum_{i=0}^{L-1} \hat{h}_i t_{j-i}\right)\right).$$

Since $$r_j = m + \sum_{i=0}^{L-1} h_i t_{j-i} + z_j$$

the DCO estimation error is equal to $$\Delta m = \hat{m} - m = \frac{1}{26-L+1}\sum_{j=L-1}^{25}\sum_{i=0}^{L-1}\Delta h_i t_{j-i} + \frac{1}{26-L+1}\sum_{j=L-1}^{25} z_j$$

or in matrix notation, $$\Delta m U = \Delta T \Delta h + \bar{z} U.$$

The DCO tap estimation error covariance is given by $$E[\Delta m \Delta m^H] = \text{trace}(\Delta T E[\Delta h \Delta h^H] \Delta T^H) \frac{1}{26-L+1} + \frac{\sigma^2}{26-L+1}$$

where trace( ) denotes the sum of diagonal elements of a matrix. It is seen that the DCO tap estimation error variance is proportional to the sum of CIR taps estimation error variances and must therefore be several times larger. Indeed, with L=7 and training sequence TSC=5, while CIR tap estimation error variance is roughly $\sigma2/13$, DCO tap estimation variance is roughly $\sigma^2/4.5$.

Perturbed Joint LS CIR DCO Estimation

As shown previously, the reason joint LS CIR DCO estimation produces significantly worse performance with some training sequences is that most of EDGE training sequences were not created with joint LS CIR DCO estimation in mind. While all of them have good auto- and cross-correlation properties, means of different portions of most training sequences do not tend to zero and are actually quite large. It should be clear from the previous discussion that the performance of the joint LS CIR DCO estimation would approach that of the LS CIR estimation provided elements of matrix $\Delta T$ could be made to approach zero.

Consider, for example, that instead of the model $$r_j = \sum_{i=0}^{L-1} h_i t_{j-i} + m + z_j,$$

the model $$r_j = \sum_{i=0}^{L-1} h_i t_{j-i} + f_j m + z_j$$

is used, where $f_j$ is a generic function of j, for example $$f_j = \sum_p e^{\frac{i 2\pi j}{k_p}}$$

where p is the number of factors for the function and $k_p$ is an integer selected by designer. It should be noted that both the joint LS CIR DCO estimation and LS CIR estimation are special cases of this model. In the former, $f_j=1$, while in the latter, $f_j=0$.

With the new model, our estimation problem becomes $T(f)^H T(f) h = T(f)^H r$, while $T(f)^H T(f)$ is given by:

$$T(f)^H T(f) = \begin{bmatrix} \sum_{j=L-1}^{25} |t_j|^2 & \sum_{j=L-1}^{25} t_j^H t_{j-1} & \cdots & \sum_{j=L-1}^{25} t_j^H t_{j-L+1} & \sum_{j=L-1}^{25} f_j t_j^H \\ \sum_{j=L-1}^{25} t_j t_{j-1}^H & \sum_{j=L-1}^{25} |t_{j-1}|^2 & \cdots & \sum_{j=L-1}^{25} t_{j-1}^H t_{j-L+1} & \sum_{j=L-1}^{25} f_j t_{j-1}^H \\ \vdots & \vdots & \cdots & \vdots & \vdots \\ \sum_{j=L-1}^{25} t_j t_{j-L+1}^H & \sum_{j=L-1}^{25} t_{j-1} t_{j-L+1}^H & \cdots & \sum_{j=L-1}^{25} |t_{j-L+1}|^2 & \sum_{j=L-1}^{25} f_j t_{j-L+1}^H \\ \sum_{j=L-1}^{25} t_j f_j^H & \sum_{j=L-1}^{25} t_{j-1} f_j^H & \cdots & \sum_{j=L-1}^{25} t_{j-L+1} f_j^H & \sum_{j=L-1}^{25} |f_j|^2 \end{bmatrix}$$

and $T(f)^H r$ is given by $$T(f)^H r = \begin{bmatrix} \sum_{j=L-1}^{25} t_j^H r_j \\ \sum_{j=L-1}^{25} t_{j-1}^H r_j \\ \vdots \\ \sum_{j=L-1}^{25} t_{j-L+1}^H r_j \\ \sum_{j=L-1}^{25} f_j^H r_j \end{bmatrix}$$

The last row of the equation gives a modified expression for DCO estimation:

$$\hat{m} = \frac{1}{\sum_{j=L-1}^{25} |f_j|^2} \left( \sum_{j=L-1}^{25} f_j^H \left( r_j - \sum_{i=0}^{L-1} \hat{h}_i t_{j-i} \right) \right)$$

As above, parameter m can be eliminated from the above equation, thus obtaining the same expression for estimation of the CIR only:

$$\hat{h} = (T^H(T-\Delta T(f)))^{-1}T^H(r-\bar{r}(f))$$

where T is now of reduced dimension (L×26−L+1), unchanged from before since it is not a function of $f_j$, while $\Delta T(f)$ is a (L×26−L+1) matrix, given by $$\Delta T(f) = \frac{1}{\sum_{j=L-1}^{25}|f_j|^2}$$

$$\begin{bmatrix} f_{L-1}\sum_{j=L-1}^{25}f_j^H t_j & f_{L-1}\sum_{j=L-1}^{25}f_j^H t_{j-1} & \cdots & f_{L-1}\sum_{j=L-1}^{25}f_j^H t_{j-L+1} \\ \vdots & \vdots & & \vdots \\ f_{25}\sum_{j=L-1}^{25}f_j^H t_j & f_{25}\sum_{j=L-1}^{25}f_j^H t_{j-1} & \cdots & f_{25}\sum_{j=L-1}^{25}f_j^H t_{j-L+1} \end{bmatrix}$$

and $$r(f) = \frac{1}{\sum_{j=L-1}^{25}|f_j|^2} \begin{bmatrix} f_{L-1}\sum_{j=L-1}^{25}f_j^H r_j \\ \vdots \\ \vdots \\ f_{25}\sum_{j=L-1}^{25}f_j^H r_j \end{bmatrix}$$

is a (L×1) vector.

Note that, as for $f_j 1$, the following relations are still valid:

$$T^H \Delta T(f) = \Delta T(f)^H T = \Delta T(f)^H \Delta T(f)$$

$$\Delta T(f)^H r = \Delta T(f)^H \bar{r}(f)$$

Consequently, $$\hat{h} = (T^H(T-\Delta T(f)))^{-1}T^H(r-\bar{r}(f)) = ((T-\Delta T(f))^H(T-\Delta T(f)))^{-1}(T-\Delta T(f))^H(r-\bar{r}(f))$$

and, since $\bar{r}(f) = mF + \Delta T(f)h + \bar{z}(f)$, where $$\bar{z}(f) = \frac{1}{\sum_{j=L-1}^{25}|f_j|^2}\sum_{j=L-1}^{25}f_j^H z_j \begin{bmatrix} f_{L-1} \\ f_L \\ \vdots \\ f_{25} \end{bmatrix}$$

and $$F = \frac{\sum_{j=L-1}^{25}f_j^H}{\sum_{j=L-1}^{25}|f_j|^2} \begin{bmatrix} f_{L-1} \\ f_L \\ \vdots \\ f_{25} \end{bmatrix},$$

the CIR estimate becomes $$\hat{h} = ((T-\Delta T(f))^H(T-\Delta T(f)))^{-1}(T-\Delta T(f))^H(r-\bar{r}(f)) = (\tilde{T}(f)^H \tilde{T}(f))^{-1}\tilde{T}(f)^H(r-\bar{r}(f))$$

while $$r-\bar{r}(f) = mU + Th + z - mF - \Delta T(f)h - \bar{z}(f) = (T-\Delta T(f))h + m(U-F) + z - \bar{z}(f)$$

Hence, $$\hat{h} = (\tilde{T}(f)^H \tilde{T}(f))^{-1}\tilde{T}(f)^H(r-\bar{r}(f)) = (\tilde{T}(f)^H \tilde{T}(f))^{-1}\tilde{T}(f)^H(\tilde{T}(f)h + m(U-F) + z - \bar{z}(f))$$

$$\hat{h} = h + (\tilde{T}(f)^H \tilde{T}(f))^{-1}\tilde{T}(f)^H(z-\bar{z}(f) + m(U-F)) = h + \Delta h$$

The CIR estimation error consists of two parts, one of which is due to noise while the other is due to model mismatch (i.e., assumption that $f_j$ is not equal to 1). Joint LS CIR DCO estimation error covariance matrix for CIR taps therefore becomes $$E[\Delta h \Delta h^H] = \sigma^2(\tilde{T}(f)^H \tilde{T}(f))^{-1} + |m|^2(\tilde{T}(f)^H \tilde{T}(f))^{-1}\tilde{T}(f)^H(U-F)(U-F)^H\tilde{T}(f)(\tilde{T}(f)^H\tilde{T}(f))^{-1}$$

$$E[\Delta h \Delta h^H] = \sigma^2(T^H(T-\Delta T(f)))^{-1} + |m|^2(T^H(T-\Delta T(f)))^{-1}T^H(U-F)(U-F)^H T(T^H(T-\Delta T(f)))^{-1}$$

The CIR estimation error covariance matrix consists of two parts, one stochastic due to AWGN, and the other deterministic, due to DCO.

Furthermore, DCO estimate is obtained by $$\hat{m} = \frac{1}{\sum_{j=L-1}^{25}|f_j|^2}\left(\sum_{j=L-1}^{25}f_j^H\left(r_j - \sum_{i=0}^{L-1}\hat{h}_i t_{j-i}\right)\right)$$

Since $$r_j = m + \sum_{i=0}^{L-1}h_i t_{j-i} + z_j$$

the DCO estimation error is equal to $$\Delta m = \hat{m} - m = m\left(\frac{\sum_{j=L-1}^{25}f_j^H}{\sum_{j=L-1}^{25}|f_j|^2} - 1\right) + \frac{1}{\sum_{j=L-1}^{25}|f_j|^2}\sum_{i=0}^{L-1}\Delta h_i \sum_{j=L-1}^{25}f_j^H t_{j-i} + \frac{1}{\sum_{j=L-1}^{25}|f_j|^2}\sum_{j=L-1}^{25}f_j^H z_j$$

or, in matrix notation, $$\Delta m = m(f^H U/(f^H f) - 1) + U^H \frac{\Delta T(f)\Delta h + \bar{z}(f)}{U^H f}$$

where U is a vector with all elements equal to 1, and $f = [f_{L-1}\ f_L\ \ldots\ f_{25}]^T$.

As in the case of CIR estimation error, the DCO tap estimation error also includes two parts, one due to AWGN, and the other due to model mismatch and proportional to the DCO value.

The expressions for CIR estimation error and DCO estimation error provide guidance with regard to which conditions function $f_j$ must fulfill to reduce the estimation error.

The first condition, leading to reduction of CIR estimation error due to AWGN, is that the elements of $\Delta T(f)$ should be close to zero (or equal to zero):

$$\sum_{j=L-1}^{25} f_j^H t_{j-k} \rightarrow 0, \forall k = (0, 1, \ldots, L-1)$$

If that condition is valid, the CIR estimation error covariance matrix becomes:

$$E[\Delta h \Delta h^H] = \sigma^2 (T^H T)^{-1} + |m|^2 (T^H T)^{-1} T^H (U-F)(U-F)^H T (T^H T)^{-1}$$

Estimation error due to AWGN is now the same as in the LS CIR estimation. However, the error due to model mismatch remains and is proportional to $$26 - L + 1 = \frac{\left|\sum_{j=L-1}^{25} f_j\right|^2}{\sum_{j=L-1}^{25} |f_j|^2}$$

so that the second condition is to make the above relation also approach zero. If function $f_j$ fulfills both of the above conditions, then the CIR estimation error for joint LS CIR DCO estimation would be the same as the CIR estimation error for LS CIR estimation.

Additionally, $f_j$ must fulfill the following conditions to reduce the DCO estimation error.

$$\frac{\sum_{j=L-1}^{25} f_j^H}{\sum_{j=L-1}^{25} |f_j|^2} - 1 \rightarrow 0$$

This condition would eliminate error due to model mismatch. Furthermore, if $\Delta T(f)=0$, the coupling of the CIR estimation error to the DCO estimation error would also be eliminated, so the DCO estimation error would become a function of AWGN only.

$$\Delta m = \frac{1}{\sum_{j=L-1}^{25} |f_j|^2} \sum_{j=L-1}^{25} f_j^H z_j$$

In that case, DCO estimation error variance would be equal to:

$$E[\Delta m \Delta m^H] = \sigma^2 \frac{1}{\sum_{j=L-1}^{25} |f_j|^2}$$

which is the last condition for optimality and should ideally be equal to $\sigma^2/(26-L+1)$, which is the Cramer-Rao bound for LS CIR DCO estimation.

Thus, provided a function $f_j$ can be identified that can fulfill all of the above conditions, the optimal estimation error can be found regardless of the training sequence.

Unfortunately, some of listed conditions are contradictory (i.e., cannot be simultaneously fulfilled), indicating that Cramer-Rao bound cannot be reached with perturbed joint LS CIR DCO estimation.

The paper of Hui entitled, "Using a direct conversion receiver in EDGE terminals-a new DC offset compensation algorithm," proposes a different approach in the elimination of error caused by DC offset. The proposed method modifies the receiver in such a way that the received signal can be modeled as $$r_j = m e^{i\delta j} + \sum_{k=0}^{L-1} h_k t_{j-k} + z_j$$

where $i=(-1)^{0.5}$ and $\delta$ is a pre-selected angle, a function of the training sequence. Thus, their proposal can be interpreted as a special case using function $f_j = e^{i\delta j}$. This function is well suited for minimizing $\Delta T(f)$ and can therefore provide estimation error close to LS CIR estimation error. Hui proposes that the DCO be "rotated" in the following manner: frequency of LO which is part of radio section is to be deliberately offset by $\delta$ before the DC offset is introduced in the signal chain. When this rotation is corrected in the baseband, the DCO is effectively rotated by the same angle, since it was added to the received signal in the meantime. The improvement of the estimation error will depend on the accuracy with which the LO frequency can be controlled and the receiver requires a control path between baseband receiver (where the received data are decoded and the receiver discovers which training sequence it is supposed to receive) and the LO. Also, proposed correction will require that there is known relationship between the number of TS and introduced frequency offset, i.e. function f depends on the training sequence. Hui's method requires interactions between radio and baseband portions of receiver, and has training sequence dependant frequency offset.

Conditions needed for the reduction of estimation error as derived by the inventors to the Cramer-Rao bound cannot all be fulfilled at the same time and problem can be approached with several suboptimal techniques.

In general, suboptimal approaches would try to find functions that fulfill some, instead of all, the above-listed conditions for optimality and modify the estimation procedure in such a way that would maximally exploit the characteristics of the perturbed joint LS estimator. Secondly, when searching for an optimal function $f_j$, one is faced with the difficulty of finding a closed form solution that would fulfill all conditions for optimality. However, one may opt to find closed form solutions for functions that fulfill at least some of the conditions for optimality. Alternatively, a parametric form for the function $f_j$ can be specified, and then a search can be performed for identifying parameters that minimize some metric related to the overall estimation error.

Another approach dispenses with the seeking of a function $f_j$ that fully eliminates errors due to mismatch and non-zero $\Delta T$ elements. Instead, a function $f_j$ is identified that improves is CIR estimation error by reducing $\Delta T$ elements while minimally increasing estimation error due to mismatch. Good solutions are found by minimizing an error-related metric with respect to parameters of some parametric function. A good candidate for such a function is obviously one or a combination of several complex sinusoids, $e^{i\delta j}$.

One possibility is to seek a parameter $\delta$ that minimizes the metric $$(T^H(T-\Delta T(f)))^{-1} + w(T^H(T-\Delta T(f)))^{-1} T^H(U-F)(U-F)^H T (T^H(T-\Delta T(f)))^{-1}$$

where $f_j = 1 - e^{i\delta j}$, and w is a weight proportional to the ratio of DCO magnitude and AWGN variance. The idea is to find the function $f_j$ that reduces CIR estimation error. Then, given that DCO estimation error is proportional to CIR estimation error, DCO is estimated as if $f_j = 1$, $$\hat{m} = \frac{1}{26-L+1}\left(\sum_{j=L-1}^{25}\left(r_j - \sum_{i=0}^{L-1} \hat{h}_i t_{j-1}\right)\right)$$

Another possible approach is based on the observation that as long as the DCO estimation error in perturbed LS solution can be reduced below the level of the DCO estimation error with $f_j = 1$, iterative joint perturbed LS CIR DCO estimation (as presented in FIG. 3) is bound to reduce the overall estimation error. It turns out that for TSC=5, function $f_j = 0.5(1 - e^{i\delta j})$, where $\delta = -2\pi/(26-L+2)$, is a good choice for such a function. Interestingly, this function fulfils the condition that $$\frac{\sum_{j=L-1}^{25} f_j^H}{\sum_{j=L-1}^{25} |f_j|^2} - 1 \to 0$$

while also significantly reducing the elements of $\Delta T$ matrix. With this approach, an "ordinary" joint LS CIR DCO estimate is first obtained, then, as a second step, the DCO estimate is subtracted. Then, the estimation is repeated, but this time using perturbed joint LS CIR DCO estimation. The final DCO estimate is the sum of the initial and improved DCO estimates, while the CIR estimate is the second, perturbed LS CIR estimate. This method works best at high Eb/NO, giving an improvement of 2.0 dB in a MCS7 HT100 channel, with TSC=5, for example.

Furthermore, the present invention includes a computer program code based product, which is a storage medium having program code stored therein which can be used to instruct a computer to perform any of the methods associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage devices.

Implemented in computer program code based products are software modules for: (a) receiving a signal bust r(n); (b) storing received burst samples, r(n), in memory; (c) averaging the stored burst samples, r(n), and calculating an initial DC offset, $A_0$, from the stored burst samples; (d) removing DC offset value from stored burst as follows: $r(n)-A_0$; (e) estimating an updated DC offset, $A_1$, and a channel impulse response (CIR), ĥ, via a perturbed LS CIR estimation representation modeling received burst r(n) as follows:

$$r_j = \sum_{i=0}^{L-1} h_i t_{j-i} + f_j m + z_j$$

where $h_i$ are CIR taps, $t_j$ are known training sequence symbols, $f_j$ is a generic function of j, m is static DC offset; and $z_j$ is additive white Gaussian noise, and removing updated DC offset from stored burst as follows: $r(n)-A_0-A_1$.

What is claimed is:

1. A method for reducing DC offset associated with a receiver comprising the steps of:
   (a) receiving signal burst samples, r(n);
   (b) storing said received burst samples, r(n), in memory;
   (c) averaging said stored burst samples, r(n), and calculating an initial DC offset, $A_0$, from the stored burst samples;
   (d) removing DC offset value from stored burst samples as follows: $r(n)-A_0$;
   (e) estimating an updated DC offset, $A_1$, and a channel impulse response (CR), ĥ, via a perturbed least squares (LS) CIR estimation representation modeling received burst samples r(n) as follows:

$$r_j = \sum_{i=0}^{L-1} h_i t_{j-i} + f_j m + z_j$$

where $h_i$ are CR taps, $t_j$ are known training sequence symbols, $f_j$ is a generic function of j, m is static DC offset; and $z_j$ is additive white Gaussian noise, and
   (f) removing updated DC offset from stored burst samples as follows: $r(n)-A_0-A_1$.

2. A method as per claim 1, wherein said function $f_j$ satisfies the following conditions:

$$\sum_{j=L-1}^{25} f_j^H t_{j-k} \to 0, \forall k = (0, 1, \ldots, L-1), L \text{ is an integer and}$$

$$\frac{\sum_{j=L-1}^{25} f_j^H}{\sum_{j=L-1}^{25} |f_j|^2} - 1 \to 0.$$

3. A method as per claim 1, wherein said receiver is an EDGE receiver.

4. A method as per claim 1, wherein said method for reducing DC offset is implemented in its entirety in a digital domain.

5. A method as per claim 1, wherein said function $f_j$ is given by $$f_j = \sum_p e^{\frac{i2\pi j}{k_p}},$$

where p is the number of factors for the function and $k_p$ is an integer.

6. An article of manufacture comprising a computer readable medium having computer readable code embodied therein for reducing DC offset associated with a receiver, said medium comprising:
  (a) computer readable program code for receiving signal burst samples, r(n);
  (b) computer readable program code for storing the received burst samples, r(n), in memory;
  (c) computer readable program code for averaging said stored burst samples, r(n), and calculating an initial DC offset, $A_0$, from the stored burst samples;
  (d) computer readable program code for removing DC offset value from stored burst as follows: $r(n)-A_0$;
  (e) computer readable program code estimating an updated DC offset, $A_1$, and a channel impulse response (CIR), ĥ, via a perturbed least squares (LS) CIR estimation representation modeling received burst samples r(n) as follows:

$$r_j = \sum_{i=0}^{L-1} h_i t_{j-i} + f_j m + z_j$$

where $h_i$ are CIR taps, $t_j$ are known training sequence symbols, $f_j$ is a generic function of j, m is static DC offset; and $z_j$ is additive white Gaussian noise, and
  (f) computer readable program code removing updated DC offset from stored burst as follows: $r(n)-A_0-A_1$.

7. A method for reducing DC offset associated with a receiver comprising the steps of:
  (a) receiving signal burst samples, r(n);
  (b) storing said received burst samples, r(n), in memory;
  (c) averaging said stored burst samples, r(n), and calculating an initial DC offset, $A_0$, from the stored burst samples;
  (d) removing DC offset value from stored burst samples as follows: $r(n)-A_0$;
  (e) identifying a rough timing estimate defining a position of largest channel impulse response (CIR) tap via cross-correlating stored burst samples with a training sequence;
  (f) performing fine CIR synchronization to identify taps to be added to said identified largest CIR tap;
  (g) estimating an updated DC offset, $A_1$, and a CIR, ĥ, via a perturbed least squares (LS) CIR estimation representation modeling received burst samples r(n) as follows:

$$r_j = \sum_{i=0}^{L-1} h_i t_{j-i} + f_j m + z_j$$

where $h_i$ are CR taps, $t_j$ are known training sequence symbols, $f_j$ is a generic function of j, m is static DC offset; and $z_j$ is additive white Gaussian noise, and (h) removing updated DC offset from stored burst samples as follows: $r(n)-A_0-A_1$.

8. A method as per claim 7, wherein said function $f_j$ satisfies the following conditions:

$$\sum_{j=L-1}^{25} f_j^H t_{j-k} \to 0, \forall k = (0, 1, \ldots, L-1), L \text{ is an integer and}$$

$$\frac{\sum_{j=L-1}^{25} f_j^H}{\sum_{j=L-1}^{25} |f_j|^2} - 1 \to 0.$$

9. A method as per claim 7, wherein said receiver is an EDGE receiver.

10. A method as per claim 7, wherein said function $f_j$ is given by $$f_j = \sum_p e^{\frac{i2\pi j}{k_p}},$$

where p is the number of factors for the function and $k_p$ is an integer.

11. A method as per claim 7, wherein said method for reducing DC offset is implemented in its entirety in a digital domain.

12. A communication system wherein information is transmitted through a channel having a discrete channel impulse response (CIR) to produce at an output of the channel, a signal, $r_1$, where:

$$r_j = \sum_{i=0}^{L-1} h_i t_{j-i} + f_j m + z_j$$

where $h_i$ are CIR taps, $t_j$ are known training sequence symbols, $f_j$ is a generic function of j, m is static DC offset; and $z_j$ is additive white Gaussian noise, such system comprising:
  a receiver for receiving transmitted information, said receiver having a processor programmed to identify a DC offset estimate and a CIR estimate, said function $f_j$ that reduces estimation error while keeping model mismatch error low, and said processor identifying said function $f_j$ satisfying the following conditions:

$$\sum_{j=L-1}^{25} f_j^H t_{j-k} \to 0, \forall k = (0, 1, \ldots, L-1),$$

$$L \text{ is an integer and} \frac{\sum_{j=L-1}^{25} f_j^H}{\sum_{j=L-1}^{25} |f_j|^2} - 1 \to 0.$$

13. The system of claim 12, wherein said receiver is an EDGE receiver.

14. The system of claim 12, wherein said function $f_j$ is given by $$f_j = \sum_p e^{\frac{i2\pi j}{k_p}},$$

where p is the number of factors for the function and k is an integer.

15. An article of manufacture comprising a computer readable medium having computer readable program code embodied therein aiding a receiver in receiving transmitted information, said information is transmitted through a channel having a discrete channel impulse response (CIR) to produce at an output of the channel, a signal, $r_j$, where:

$$r_j = \sum_{i=0}^{L-1} h_i t_{j-i} + f_j m + z_j$$

where $h_i$ are CIR taps, $t_j$ are known training sequence symbols, $f_1$ is a generic function of j, m is static DC offset; and $z_j$ is additive white Gaussian noise, such medium comprising:

computer readable program code for identifying said function $f_j$ that reduces estimation error while keeping model mismatch error low, and said computer readable program code identifying said function $f_j$ satisfying the following conditions:

$$\sum_{j=L-1}^{25} f_j^H t_{j-k} \to 0, \forall k = (0, 1, \ldots, L-1),$$

$L$ is an integer and $\dfrac{\sum_{j=L-1}^{25} f_j^H}{\sum_{j=L-1}^{25} |f_j|^2} - 1 \to 0.$ 16. An article of manufacture of claim 15, wherein said receiver is an EDGE receiver.

17. An article of manufacture of claim 15, wherein said function $f_j$ is given by $$f_j = \sum_p e^{\frac{i2\pi j}{k_p}},$$

where p is the number of factors for the function and $k_p$ is an integer.

18. An integrated circuit implemented in conjunction with a receiver in a communications system for reducing DC offset associated with said receiver, said integrated circuit comprising:
   (a) an interface to receive signal burst samples, r(n);
   (b) memory to store said received burst samples, r(n);
   (c) an averaging component to average said stored burst samples, r(n), calculate an initial DC offset, $A_0$, from said stored burst samples, and remove said initial DC offset value from stored burst samples as follows: $r(n)-A_0$;
   (d) a perturbed least squares channel impulse response (LS CIR) estimator to estimate an updated DC offset, $A_1$, and CIR, ĥ, via a perturbed least square (LS) CIR estimation representation modeling received burst r(n) as follows:

$$r_j = \sum_{i=0}^{L-1} h_i t_{j-i} + f_j m + z_j$$

where $h_i$ are CIR taps, $t_j$ are known training sequence symbols, $f_j$ is a generic function of j, m is static DC offset; and $z_j$ is additive white Gaussian noise, and removing updated DC offset from stored burst as follows: $r(n)-A_0-A_1$.

19. An integrated circuit implemented in conjunction with a receiver in a communications system for reducing DC offset associated with said receiver, as per claim 18, wherein said receiver is an EDGE receiver.

20. An integrated circuit implemented in conjunction with a receiver in a communications system for reducing DC offset associated with said receiver, as per claim 18, wherein said function $f_j$ is given by $$f_j = \sum_p e^{\frac{i2\pi j}{k_p}}$$

where p is the number of factors for the function and $k_p$ is an integer.

* * * * *